(12) United States Patent
Kelly

(10) Patent No.: US 8,531,953 B2
(45) Date of Patent: Sep. 10, 2013

(54) SYSTEM AND METHOD FOR NETWORK TRAFFIC SPLITTING

(75) Inventor: Reed Kelly, River Edge, NJ (US)

(73) Assignee: Barclays Capital Inc., New York, NY (US)

(*) Notice: Subject to any disclaimer, the term of this patent is extended or adjusted under 35 U.S.C. 154(b) by 289 days.

(21) Appl. No.: 11/358,340

(22) Filed: Feb. 21, 2006

(65) Prior Publication Data

US 2007/0195750 A1    Aug. 23, 2007

(51) Int. Cl.
*H04L 12/26* (2006.01)
*H04L 12/54* (2006.01)
*H04L 12/56* (2006.01)
*H04L 12/66* (2006.01)
*G06F 15/173* (2006.01)

(52) U.S. Cl.
USPC ........... 370/235; 370/254; 370/390; 370/401; 370/428; 370/432; 709/238

(58) Field of Classification Search
USPC ................. 370/352, 235, 254, 390, 401, 428, 370/432; 709/238
See application file for complete search history.

(56) References Cited

U.S. PATENT DOCUMENTS

| | | | | |
|---|---|---|---|---|
| 5,857,190 | A * | 1/1999 | Brown | 1/1 |
| 6,260,148 | B1 | 7/2001 | Aggarwal et al. | |
| 6,526,442 | B1 | 2/2003 | Stupek, Jr. et al. | |
| 6,571,285 | B1 * | 5/2003 | Groath et al. | 709/223 |
| 6,594,704 | B1 * | 7/2003 | Birenback et al. | 709/238 |
| 6,697,802 | B2 * | 2/2004 | Ma et al. | 1/1 |
| 7,623,515 | B2 * | 11/2009 | Breuer et al. | 370/389 |
| 7,849,199 | B2 * | 12/2010 | Schulz et al. | 709/228 |
| 2002/0159463 | A1 | 10/2002 | Wang | |
| 2003/0014540 | A1 * | 1/2003 | Sultan et al. | 709/240 |
| 2003/0154297 | A1 * | 8/2003 | Suzuki et al. | 709/229 |
| 2003/0169749 | A1 | 9/2003 | Huang et al. | |
| 2003/0188188 | A1 | 10/2003 | Padmanabhan et al. | |
| 2003/0217119 | A1 * | 11/2003 | Raman et al. | 709/219 |
| 2003/0229708 | A1 | 12/2003 | Lie | |
| 2004/0205215 | A1 * | 10/2004 | Kouvelas et al. | 709/231 |

(Continued)

FOREIGN PATENT DOCUMENTS

| | | |
|---|---|---|
| EP | 1158725 | 11/2001 |
| EP | 1376 931 | 1/2004 |

(Continued)

OTHER PUBLICATIONS

Shipley, Greg; "Security Information Management Tools: Netforensics Leads a Weary Fleet"; Apr. 2, 2002; Network Computing, pp. 51-59.

(Continued)

*Primary Examiner* — Alpus H Hsu
(74) *Attorney, Agent, or Firm* — Morgan Lewis & Bockius LLP

(57) ABSTRACT

A system is described where a routing server is configured to receive data packets from one or more servers on a computer network. Data packets may contain system event data that represent, for example, security events or system status. Each data packet is opened at the routing server and may be forwarded to one or more destination hosts depending on the contents of the data packet. Routing server compiles statistics on the source and destination of the data packets and periodically or in response to a command, writes the compiled statistics to a file.

18 Claims, 2 Drawing Sheets

(56) References Cited

U.S. PATENT DOCUMENTS

| | | | |
|---|---|---|---|
| 2004/0244011 A1* | 12/2004 | Morris et al. | 719/318 |
| 2004/0268357 A1 | 12/2004 | Joy et al. | |
| 2005/0078660 A1* | 4/2005 | Wood | 370/352 |
| 2005/0154768 A1* | 7/2005 | Theimer et al. | 707/200 |
| 2005/0183143 A1* | 8/2005 | Anderholm et al. | 726/22 |
| 2006/0092853 A1* | 5/2006 | Santoso et al. | 370/252 |
| 2006/0179013 A1* | 8/2006 | Beliveau et al. | 706/6 |
| 2006/0235909 A1* | 10/2006 | Oks et al. | 707/204 |
| 2007/0014277 A1* | 1/2007 | Ebbesen et al. | 370/351 |
| 2007/0014278 A1* | 1/2007 | Ebbesen et al. | 370/351 |
| 2007/0014307 A1* | 1/2007 | Srinivasan et al. | 370/466 |
| 2007/0028000 A1* | 2/2007 | Ebbesen et al. | 709/238 |
| 2007/0038703 A1* | 2/2007 | Tendjoukian et al. | 709/206 |

FOREIGN PATENT DOCUMENTS

| | | |
|---|---|---|
| JP | 8137810 | 5/1996 |
| JP | 2000022687 | 1/2000 |
| JP | 2000156680 | 6/2000 |
| JP | 2000244492 | 9/2000 |
| WO | WO 00/62454 | 10/2000 |
| WO | WO 01/98968 | 12/2001 |
| WO | 0215474 | 2/2002 |
| WO | WO 02/15522 | 2/2002 |
| WO | 03049369 | 6/2003 |

OTHER PUBLICATIONS

Written Opinion of PCT/US2006/012088 dated Nov. 6, 2007, 6 pages.

International Search Report of PCT/US2006/012088 dated Nov. 6, 2007, 6 pages.

International Preliminary Report on Patentability of PCT/US2006/012088 dated Sep. 4, 2008, 8 pages.

Publication of PCT/US2006/012088 dated Aug. 30, 2007, 12 pages.

JP First Office Action dated Dec. 7, 2010 for Japanese Application No. 2008-556293, 2 pages.

Carzaniga A. et al., "A Routing Scheme for Content-based Networking", INFOCOM 2004, Twenty-third Annual Joint Conference of the IEEE Computer and Communications Societies, IEEE, Piscataway, NJ, vol. 2, Mar. 7, 2004, pp. 918-928, XP010740838, DOI: DOI:10.1109/INFOCOM.2004.1356979; ISBN: 978-0-7803-8355-5, Sections I, II and III.A; pp. 918 and 920.

Chee-Yong Chan et al., "Scalable Filtering 1-13 of XLM Data for Web Services", IEEE Internet Computing, IEEE Service Center, NY, NY, vol. 7, No. 1, Jan. 1, 2003, pp. 49-57, XP011095519, ISSN: 1089-7801, DOI: DOI: 10.1109/MIC.2003.1167339, whole document.

Subbiah, B. et al., "Content Aware Networking in the Internet : Issues and Challenges", ICC 2001. 2001 IEEE International Conference on Communications, Conference Record, Helsinky, Finland, Jun. 11-14, 2001, [IEEE International Conference on Communications], NY NY, IEEE, vol. 4, Jun. 11, 2001, pp. 1310-1315, XP010553538, DOI: DOI:10.1109/ICC.2001.936912, iSBN: 978-0-7803-7097-5, whole document.

EP Search Report dated Feb. 28, 2011 for European Application No. 06749080.5, 8 pages.

* cited by examiner

SYSTEM AND METHOD FOR NETWORK TRAFFIC SPLITTING

BACKGROUND OF THE INVENTION

The present invention relates to managed computer networks. More specifically, the invention relates to systems and methods for managing the status of computer networks.

The stability and reliability of a company's computer network are essential for many companies that rely on their computer networks to support the company's day-to-day operations. In order to manage the increasingly large and complex computer networks, a method of recording and saving important events on each server on the network is usually required. This requirement was recognized early in the development of computer networks and all significant operating systems currently in use provide for the recording and saving of important events. The important events are saved in one of a number of data format protocols such as, for example, the syslog protocol or the SNMP protocol. Most network devices such as, for example, servers, routers, bridges, and the like may be programmed to save and transmit significant events and usually follow one of the data format protocols using one of the network transport layer protocols such as, for example, TCP or UDP. In a large network, it is not unusual for hundreds or thousands of network devices such as servers, routers, bridges, and the like to send log information about significant events.

In order to manage and distill the vast amounts of log data, Security Information Management (SIM) software is usually installed to manage the log data generated on the network. The SIM software may be a stand-alone product such as Arcsight, for example, or may be part of a network management software such as, for example, HP Openview from Hewlitt-Packard. Each SIM product uses a specific protocol to receive security data from the network. Some network devices can send security data to only one destination while others can send to multiple destinations thereby enabling multiple network-dispersed SIM products to receive the log data. Furthermore, some protocols require modification of the data packet while the data packet is routed through the network. The wide variety of methods used by the SIM products makes evaluation and testing of SIM products on a live network very difficult. Furthermore, in large networks, several SIM products may be installed to support different network management functions for different support groups.

Protocols such as syslog and SNMP provide for a common format for reporting basic system events by network devices and servers to a variety of SIM products but these products do not consolidate or distill the raw data into useful information that a system administrator can use to intelligently manage the computer network. Furthermore, system administration is usually not done from a central location by a single group. Instead, the various system administration functions such as network engineering or network security are done by different groups that may be geographically distributed throughout the company's network. Each group must receive timely and accurate data to perform their function. Therefore, there remains a need for systems and methods that provide the relevant event logging data to each of the system administration functions that manage the computer network.

SUMMARY OF THE INVENTION

A system is described where a routing server is configured to receive data packets from one or more servers on a computer network. Data packets may contain system event data that represent, for example, security events or system status. Each data packet is opened at the routing server and may be forwarded to one or more destination hosts depending on the contents of the data packet. Routing server compiles statistics on the source and destination of the data packets and periodically or in response to a command, writes the compiled statistics to a file.

One embodiment of the present invention is directed to a system comprising: one or more servers attached to a computer network; one or more destination hosts attached to the computer network; and a routing server configured to receive a data packet from the one or more servers and to forward the received data packet to the one or more destination hosts depending on the content of the data packet. In some embodiments, the data packet represents a system event. In some embodiments, the computer network is a company intranet.

Another embodiment of the present invention is directed to a method comprising: receiving a message from one or more servers; matching the received message to a pattern associated with a destination host; and forwarding the message to the destination host if the received message matches the pattern associated with the destination host. Some embodiments further comprise preventing the message from being forwarded to the destination host if the received message matches an exclude pattern associated with the destination host. In some embodiments, the step of forwarding the message further comprises creating a copy of the received message and sending the copy of the received message to the destination host.

BRIEF DESCRIPTION OF THE DRAWINGS

The invention will be described by reference to the preferred and alternative embodiments thereof in conjunction with the drawings in which.

DETAILED DESCRIPTION

Figure 1:
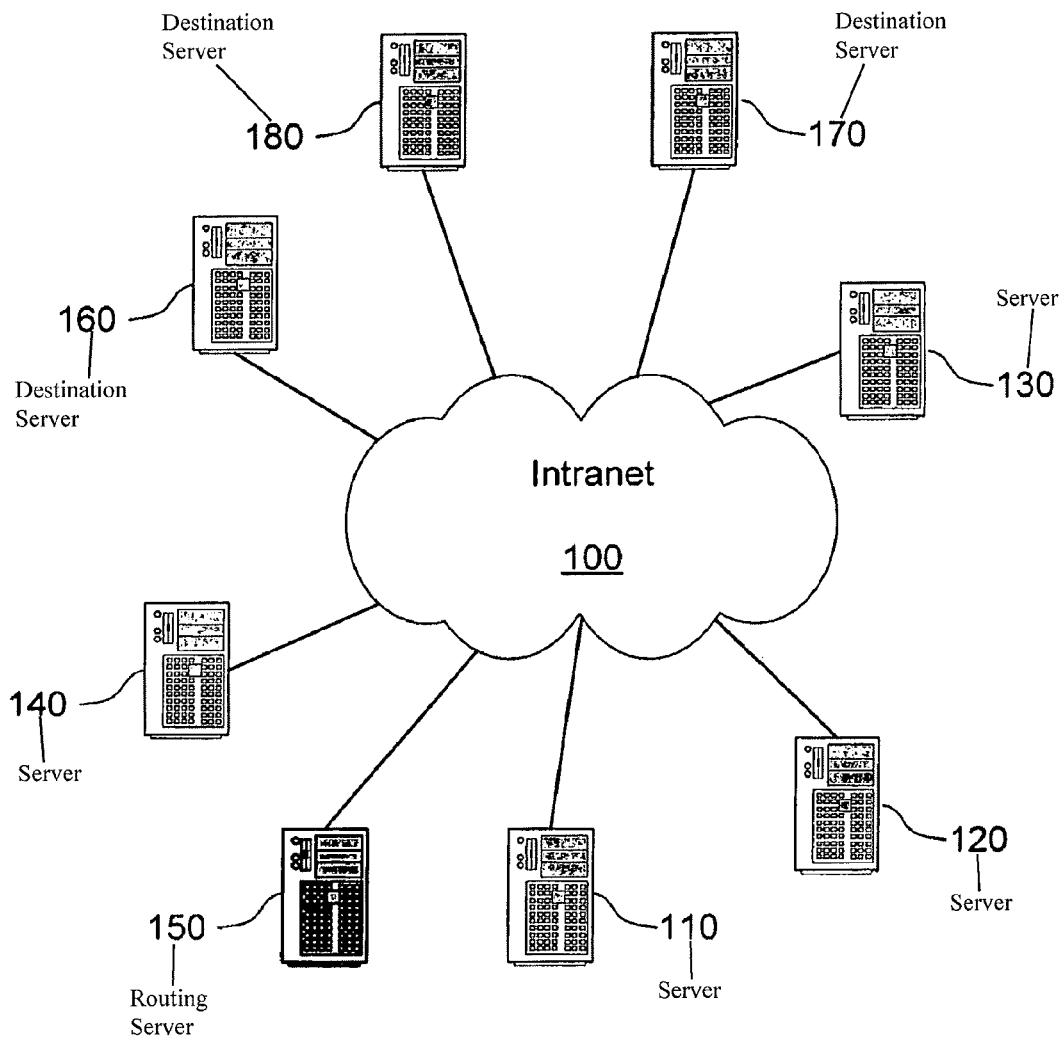
FIG. 1 is a diagram illustrating an embodiment of the present invention.

The description herein should be understood to describe only one preferred embodiment of the invention. Those skilled in the art will recognize, for example, that the described embodiment is just one simplified example of the novel system and method of network traffic splitting. The simplified example is all that needs to be described in detail in order to enable the more general system and method that the invention comprises.

Some embodiments of the present invention provide systems and methods for easily forwarding event logging data traffic to multiple destinations or SIM products. This allows for more convenient testing of various SIM products by permitting the network monitoring tools to receive a copy of the original data in real time while allowing SIM products to be changed or updated. The ability to send log traffic to multiple destinations enables other SIM or automation products to receive some or all of the log traffic. Furthermore, this enables sending devices that can only send to a single destination the ability to have their data sent to multiple destinations without modifying the sending device or its software.

Some embodiments of the present invention may forward network packets without modification and may be configured to forward network packets to specified destinations based on the contents of each packet. Furthermore, the specified destinations may include a specific port number for each port.

Statistical information may be gathered and stored for later analysis or may be provided at predetermined regular intervals. Statistical information may include the number of packets forwarded to each target destination from each of the sources. A configuration file may be used to provide forwarding rules such that sources need not be specified ahead of time. In other embodiments, configuration information may be read and/or obtained from a data base or other source.

In a preferred embodiment, traffic splitting may be implemented at the OSI level 4 transport layer. An advantage of splitting at the transport layer is that most network devices send log data as TCP or UDP data packets. By placing a network splitter at the transport layer, network traffic from a variety of network devices may be split without customizing the SIM software executing on the network. Embodiments of the present invention preferably split UDP packets typically used by network devices. UDP advantageously eliminates the overhead associated with maintaining a session between two computers required by TCP, however, it should be understood by one of skill in the art that embodiments that split TCP packets may be built without undue efforts and are within the scope of the present invention.

Embodiments of the present invention are preferably implemented using a platform-independent language such as Java that enable the UdpSplit program to execute on platforms such as Windows and Linux. The UdpSplit program preferably executes as a service such that manual intervention is not required once the program is running.

A configuration file preferably specifies the UDP port where the service listens for the UDP packets, the locations to write the log files and statistics files, and the details for each destination. For each destination, the configuration file may include a destination host name or address where the network packets are forwarded to, a network port to use to forward the packets, an include pattern such as a Perl regular expression, for example, that forwards the packet to the destination only if the packet matches the include pattern, and an exclude pattern such as a Perl regular expression, for example, that prevents the packet from being forwarded to the destination if the packet matches the exclude pattern.

FIG. 1 is a diagram illustrating an embodiment of the present invention. Servers 110, 120, 130, and 140 communicate with each other through the company's intranet 100. One or more servers may be configured to record and send system event information to a routing server 150. Routing server 150 receives data packets from the one or more servers or network devices and forwards each data packet to one or more destination servers 160, 170, and 180 according to the contents of the data packet. Destination servers 160, 170, and 180 may receive some or all of the data packets received by routing server 150 and the data received may be used by different SIM products to support network system functions such as, for example, network intrusion detection, network status, or network security. Statistics are compiled for each data packet received by routing server 150 and a report may be sent in response to a query or at predetermined times or intervals.

Figure 2:
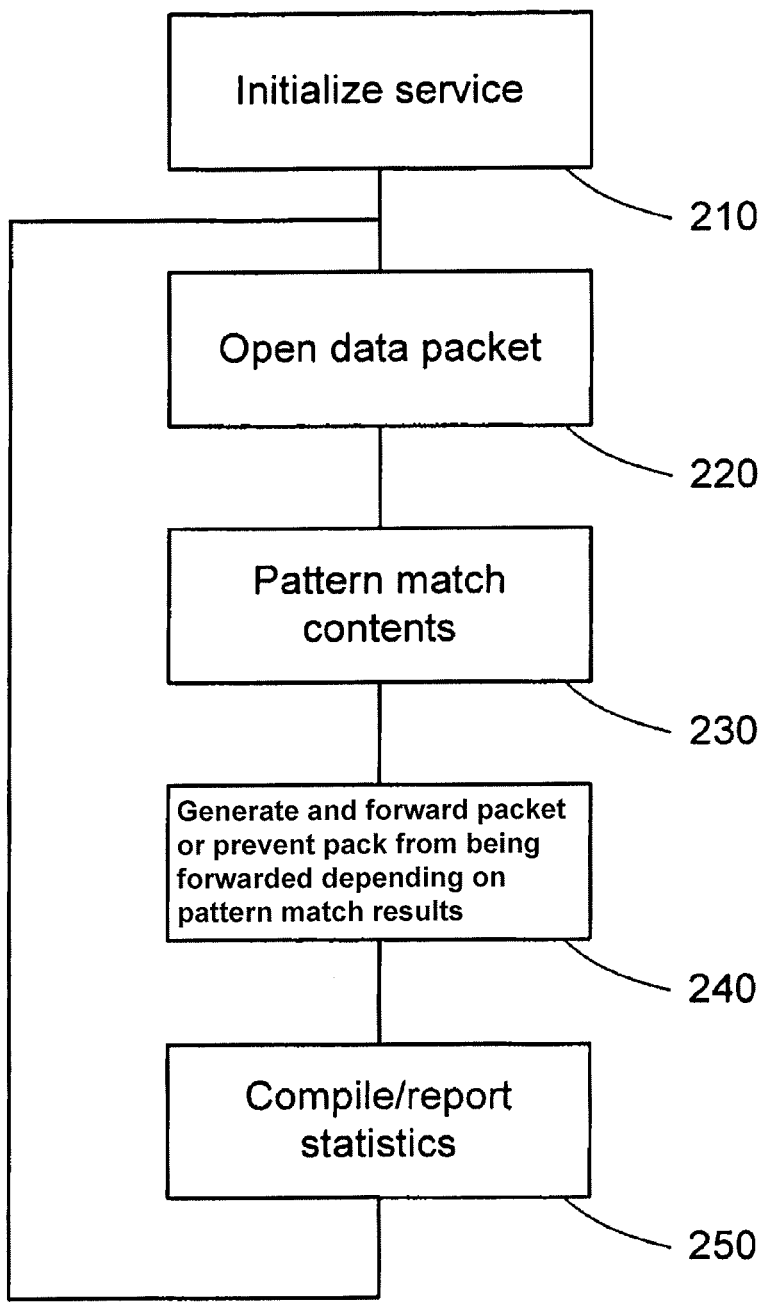
FIG. 2 is a flow diagram illustrating an embodiment of the present invention.

FIG. 2 is a flow diagram illustrating an embodiment of the present invention. An UdpSplit program is initialized at step 210. The program is preferably instantiated as a service executing on the routing server. In step 210, a configuration file is opened and read by the program. The configuration file may be stored on the routing server or may be stored on another storage device accessible to the routing server. The configuration file identifies the UDP port on the routing server where UdpSplit listens for network packets. The configuration file also identifies the destination servers and ports where the network packets are sent. For each destination server, one or more patterns may be specified to determine whether the network packet is forwarded to the destination server. The patterns are preferably Perl regular expressions although other expression protocols may be used and are understood to be within the scope of the present invention. The one or more patterns may be an include pattern such that network packets matching the include pattern are forwarded to the destination server. The one or more patterns may be an exclude pattern such that network packets matching the exclude pattern are not forwarded to the destination server.

Once the configuration file is read, UdpSplit opens connections to each of the destination hosts and their respective ports and begins listening for network packets. Each network packet received over the specified port is opened in step 220. In step 230, the contents of the data packet are matched to every include or exclude pattern associated with each destination host. When a data packet matches an exclude pattern for a destination host, UdpSplit does not send a copy of the data packet to that host. Conversely, if the data packet matches an include pattern for the destination host, UdpSplit creates a copy of the data packet and sends the copy to the destination host in step 240. A data packet may be sent to more than one destination host if the contents of the data packet match the include patterns for one or more hosts. If a host has both an include and exclude pattern, a data packet is sent to the host only if the contents of the data packet match the include pattern and does not match the exclude pattern.

When a data packet is opened, UdpSplit increments a counter associated with the host from which the data packet was received. When a data packet is forwarded to a destination host, UdpSplit increments a counter associated with the destination host. Periodically or upon command, UdpSplit writes a file containing the statistics compiled since the last report. In other embodiments, UdpSplit may write the compiled statistics to a database or forward the statistics to another data collection point. In a preferred embodiment, the statistics report may contain information such as, for example, a source address for each incoming data packet, a total count of data packets received, a count of data packets received since the last report, time of first packet received from that source address, and last period that this host sent any data. For each destination host, the statistics report may contain information such as, for example, the destination name, source address, total count of data packets forwarded to that destination, count of data packets forwarded to that destination since the last report, time of the first data packet sent to that destination, and the last period that data packets were forwarded to that destination. The last period information may be used to identify or flag when a host is taken off-line.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. In addition, those skilled in the art will recognize that the software component may be embodied as computer executable instructions stored on a non-transitory computer readable medium. Such computer system and/or software components are therefore enabled by describing their corresponding steps or elements (that is, their functionality), and are within the scope of the present invention.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A system, comprising:
   a plurality of destination hosts, each destination host associated with at least one include or exclude pattern, wherein the at least one include or exclude pattern defines whether a plurality of data packets are forwarded to at least one destination host; and
   a routing server configured to store a configuration file identifying the plurality of destination hosts, the configuration file including a destination host address, a destination host port and at least one include or exclude pattern associated with each destination host, the routing server being indirectly connected to each of the plurality of destination hosts via a computer network;
   the routing server further configured to receive a plurality of data packets containing log data for one or more system events from a plurality of network devices on the computer network,
   the routing server further configured to compare contents of the plurality of data packets to the at least one include or exclude pattern in the configuration file and to forward the plurality of data packets to at least one of the destination hosts by creating a copy of each of the data packets and sending the copy of each of the data packets to the at least one of the destination hosts if the contents of the data packet match an include pattern associated with the at least one of the destination hosts, and
   the routing server further configured to prevent the data packet from being forwarded to at least one of the destination hosts if the contents of the data packet match an exclude pattern associated with the at least one of the destination hosts.

2. The system of claim 1, wherein the routing server is further configured to receive and forward the plurality of data packets at an open systems interconnection (OSI) level 4 transport layer.

3. The system of claim 1, wherein the computer network is an intranet.

4. The system of claim 1, wherein for a destination host that is associated with both an include pattern and an exclude pattern, the routing server is further configured to, after determining that a data packet matches both the include pattern and the exclude pattern for the destination host, prevent the data packet from being forwarded to the destination host.

5. The system of claim 1, wherein at least two destination hosts are associated with an include pattern, and the routing server is further configured to forward data packets matching the include pattern to each of the at least two destination hosts associated with the include pattern.

6. The system of claim 1, wherein each of the plurality of network devices is capable of sending data to only one destination.

7. A method, comprising:
   receiving a plurality of data packets containing log data for one or more system events from a plurality of network devices on a computer network;
   storing a configuration file identifying a plurality of destination hosts, the configuration file being stored on a routing server, the routing server being indirectly connected to the plurality of destination hosts via the computer network, the configuration file including a destination host address, a destination host port and at least one include or exclude pattern associated with each destination host, wherein the at least one include or exclude pattern defines whether the plurality of data packets are forwarded to at least one destination host;
   comparing contents of the plurality of data packets to the at least one include or exclude pattern in the configuration file;
   forwarding the plurality of data packets to at least one of the destination hosts by creating a copy of each of the data packets and sending the copy of each of the data packets to the at least one of the destination hosts if the contents of the data packet match an include pattern associated with the at least one of the destination hosts; and
   preventing the data packet from being forwarded to at least one of the destination hosts if the contents of the data packet match an exclude pattern associated with the at least one of the destination hosts.

8. The method of claim 7, wherein the steps of receiving and forwarding the plurality of data packets are performed at an open systems interconnection (OSI) level 4 transport layer.

9. The method of claim 7, wherein the computer network is an intranet.

10. The method of claim 7, further comprising: for a destination host that is associated with both an include pattern and an exclude pattern, after determining that a data packet matches both the include pattern and the exclude pattern for the destination host, preventing the data packet from being forwarded to the destination host.

11. The method of claim 7, wherein at least two destination hosts are associated with an include pattern, and forwarding the plurality of data packets comprises forwarding data packets matching the include pattern to each of the at least two destination hosts associated with the include pattern.

12. The method of claim 7, wherein each of the plurality of network devices is capable of sending data to only one destination.

13. A computer implemented method, comprising:
   receiving a plurality of data packets containing log data for one or more system events from a plurality of network devices on a computer network;
   storing a configuration file identifying a plurality of destination hosts, the configuration file being stored on a routing server, the routing server being indirectly connected to the plurality of destination hosts via the computer network, the configuration file including a destination host address, a destination host port and at least one include or exclude pattern associated with each destination host, wherein the at least one include or exclude pattern defines whether the plurality of data packets are forwarded to at least one destination host;
   comparing contents of the plurality of data packets to the at least one include or exclude pattern in the configuration file;
   forwarding the plurality of data packets to at least one of the destination hosts by creating a copy of each of the data packets and sending the copy of each of the data packets to the at least one of the destination hosts if the contents of the data packet match an include pattern associated with the at least one of the destination hosts; and
   preventing the data packet from being forwarded to at least one of the destination hosts if the contents of the data packet match an exclude pattern associated with the at least one of the destination hosts.

14. The computer implemented method of claim 13, wherein the steps of receiving and forwarding the plurality of data packets are performed at an open systems interconnection (OSI) level 4 transport layer.

15. The computer implemented method of claim 13, wherein the computer network is an intranet.

16. The computer implemented method of claim 13, wherein the computer executable instructions, when executed on the computer, configure the computer to perform further steps comprising: for a destination host that is associated with both an include pattern and an exclude pattern, after determining that a data packet matches both the include pattern and the exclude pattern for the destination host, preventing the data packet from being forwarded to the destination host.

17. The computer implemented method of claim 13, wherein at least two destination hosts are associated with an include pattern, and forwarding the plurality of data packets comprises forwarding data packets matching the include pattern to each of the at least two destination hosts associated with the include pattern.

18. The computer implemented method of claim 13, wherein each of the plurality of network devices is capable of sending data to only one destination.

\* \* \* \* \*

UNITED STATES PATENT AND TRADEMARK OFFICE
CERTIFICATE OF CORRECTION

| | |
|---|---|
| PATENT NO. | : 8,531,953 B2 |
| APPLICATION NO. | : 11/358340 |
| DATED | : September 10, 2013 |
| INVENTOR(S) | : Kelly |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 512 days.

Signed and Sealed this
Third Day of March, 2015

Michelle K. Lee
*Deputy Director of the United States Patent and Trademark Office*